United States Patent [19]

Korbelak

[11] 4,434,554
[45] Mar. 6, 1984

[54] OPTICAL FIBER STRIPPING DEVICE

[75] Inventor: Kenneth N. Korbelak, Jackson, N.J.

[73] Assignee: GK Technologies, Incorporated, Greenwich, Conn.

[21] Appl. No.: 393,378

[22] Filed: Jun. 29, 1982

[51] Int. Cl.³ .............................................. H02G 1/12
[52] U.S. Cl. ................................... 30/90.8; 81/9.5 R; 30/280
[58] Field of Search ................. 81/9.5 R, 9.5 C, 9.51; 30/90.1, 90.4, 90.8, 91.1, 91.2, 280

[56] References Cited

U.S. PATENT DOCUMENTS 2,627,768 2/1953 Cook, Jr. .......................... 81/9.5 R
4,046,298 9/1977 Schroeder .......................... 81/9.51

*Primary Examiner*—Roscoe V. Parker
*Attorney, Agent, or Firm*—Hopgood, Calimafde, Kalil, Blaustein & Judlowe

[57] ABSTRACT

A simple tool, involving a suitably grooved flat base and a stripping blade movably connected thereto whereby the blade may be simply moved in and out of its stripping position, and wherein its cutting edge straddles a plurality of the base grooves. The grooves are sized as to depth, appropriate to the diameter of the optical fiber and its buffer coat, and with a small clearance, such that when the coated fiber is held and drawn in a first groove, the blade is never loaded against the glass fiber, so that the blade strips only the coating from only one side of the buffered fiber, without scoring contact with the fiber core, and further such that upon 180° rotation of the fiber to place it in a second groove, the drawn fiber will be stripped of the remaining coating, also without scoring contact with the fiber core.

5 Claims, 6 Drawing Figures

OPTICAL FIBER STRIPPING DEVICE

BACKGROUND OF THE INVENTION

The invention relates to a stripping tool, to remove the coating from buffered optical fiber, as an aid for good splicing or for other connection to a given optical communication link.

Recently, a new type of communication cable, utilizing optical fibers, has entered and is finding a place in the communication network of America. These new cables consist of a plurality of optical fibers and are destined for rapidly expanding general use. The communication channels of the past have relied upon metal pairs of conductors within the cable. The new communication channels of the future are made up of optical fibers within a given cable design. Whatever the nature of the cable design, there must be provision for individually stripping, i.e., removing protective coating from, either metallic wire or optical fiber. It is essential to a good splice at the end of a given length of cable or for the proper termination of the cable to its corresponding equipment that either the wire or optical fiber be properly prepared. Improper stripping of either will result in poor connections, excessive future maintenance, or immediate network failure, by reason of broken wire or fiber. This adds significantly to the overall cost of a system by prolonging installation time and overall maintenance cost.

In wire communication practice, it is conventional to use a standard wire-stripping tool to remove plastic insulation from the wire. However, when dealing with optical fibers, the brittle nature of glass fibers and the excellent adhesion of the protective plastic or buffer to the fiber precludes adoption of conventional wire-stripping techniques. The buffered (coated) optical fiber does not lend itself to the stripping practices of the wire-communication industry. Individual optical fibers cannot be stripped with any degree of reliablity and safety using a pocket knife, scissors, wire strippers or sandpaper. The coated glass filaments simply cannot withstand such rough handling. If the surface of a fine glass filament (typically 0.005 inch in diameter) is scratched or scored in any way, a weak point develops and the fiber is susceptible to breakage at that point when later flexed or handled. The glass fiber has the same properties as a window pane or glass rod. To cut, first score the glass (rod or plate) using a tool, and then apply pressure in the proper direction to cause the score to propagate and the glass to break. The same principle applies to fracture of an optical glass fiber, and the force required to cause damaged glass fibers to fracture is low. Consequently, there is need for a device which can easily remove the fiber coatings and yet not damage the filament.

BRIEF STATEMENT OF THE INVENTION

It is an object of the invention to provide a simple tool which enables fast, easy, efficient, safe, and economical stripping of buffered optical fiber, without damage to the fiber core.

Another object is to achieve the above object with a tool adapted to function for a plurality of sizes of buffered optical fiber.

A further object is to provide a tool of the character indicated having the ability to strip relatively great lengths of buffered optical fiber without damaging or breaking the fiber.

The invention achieves the foregoing objects in a portable tool, involving a suitably grooved flat base and a stripping blade, mounted to a blade holder, such that the blade and its holder may be simply moved in and out of its stripping position, wherein its cutting edge is flush with the flat base and is oriented to straddle the base grooves. The grooves are sized as to depth, appropriate to the diameter of the optical fiber and its buffer coat, such that when the coated fiber is held and drawn in a first groove, the blade strips only coating from one side of the buffered fiber, without scoring contact with the fiber core, and further such that upon 180° rotation of the fiber and placement in a second groove, the fiber can be drawn to strip the remaining coating, also without scoring contact with the fiber core.

DETAILED DESCRIPTION

The inventive tool will be illustratively described in detail and for a preferred embodiment, in conjunction with the accompanying drawings, in which.

Figure 1:
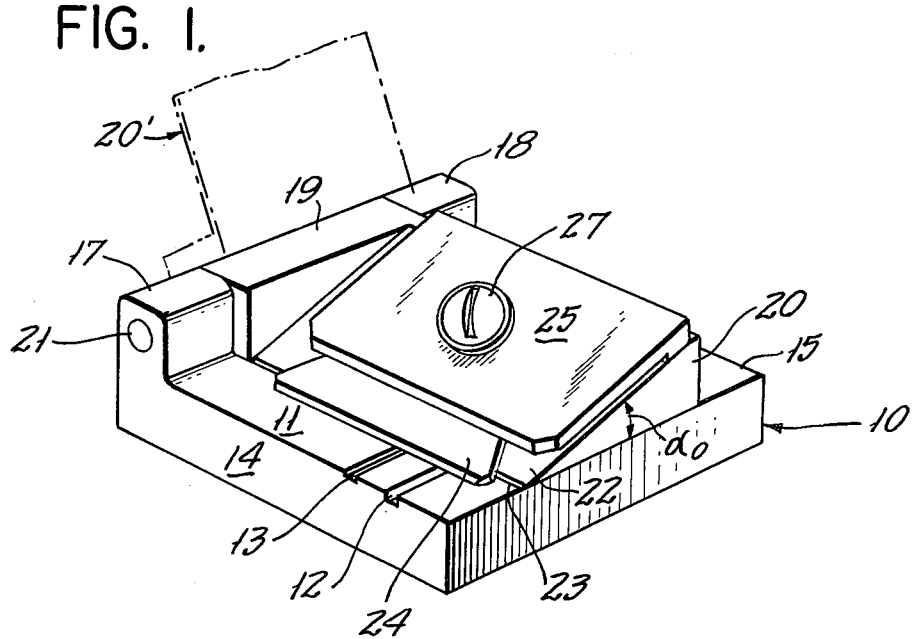
FIG. 1 is a perspective view.
Figure 2:
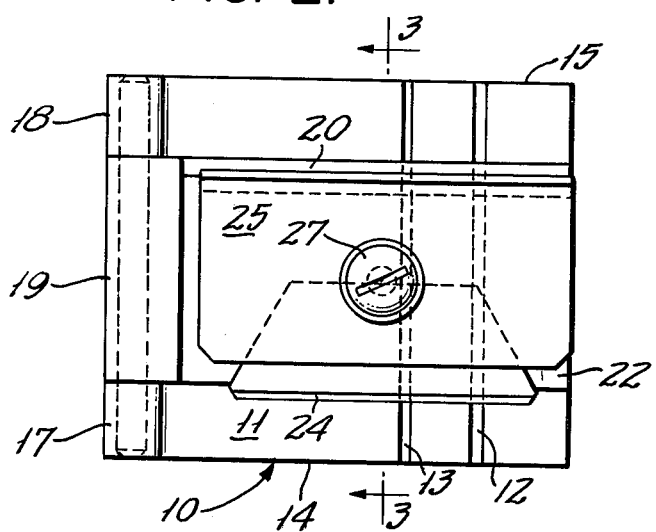
FIG. 2 is a plan view of the tool of FIG. 1.

In FIG. 1, the stripping device of the invention is seen to comprise a base member 10 having a flat upper surface 11 characterized by parallel grooves 12–13 which extend continuously from the front edge 14 to the back edge 15. At the left end, spaced bosses 17–18 rise from surface 11 to provide hinge support for the hub 19 of a blade-holder body 20, and a pintel 21 through elements 17-18-19 completes the connection. The lower surface of body 20 is flat and seats uniformly on the flat base surface 11 when in the "down" position shown in FIG. 1. And at its hub end, the lower surface of body 20 is rounded to enable hinge action to a raised position of body 20, suggested by phantom outline 20'.

Figure 3:
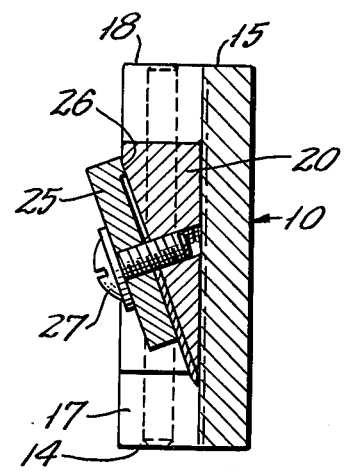
FIG. 3 is a sectional view, taken at 3—3 in FIG. 2.
Figure 5A:
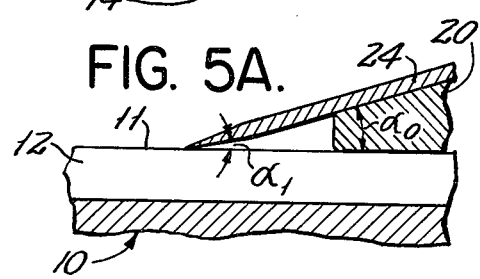
FIGS. 5A and 5B are enlarged fragmentary sectional views in the plane 3—3, local to the cutting region of FIG. 3, and respectively illustrating the absence and the presence of a buffered fiber in the course of stripping action.

Outward of its hub 19, body 20 is characterized by a flat sloping upper surface 22 at an acute angle $\alpha_0$ to the flat lower surface, and the planes of these surfaces intersect to define a front edge 23 which is parallel to the base edges 14–15 and perpendicular to the elongation of grooves 12–13, when body 20 is in the "down" position. A sharp cutting blade or knife 24, which may suitably be a type of removable blade sold for modeling purposes, is laid flat to the slope of surface 22 and is held by a clamp plate 25. A heel 26 along the bottom rear edge of plate 25 provides blade-thickness offset from body 20 so that, upon setting a clamp screw 27, the clamp-plate action may be uniform on blade 24 and also stabilized to body 20. When thus positioned and clamped, the cutting edge of blade 24 should be in the plane of base surface 11 with very little rake-angle clearance $\alpha_1$ of the honed lower surface of the blade with respect to the body surface 22 (see FIGS. 3 and 5A).

Figure 4:
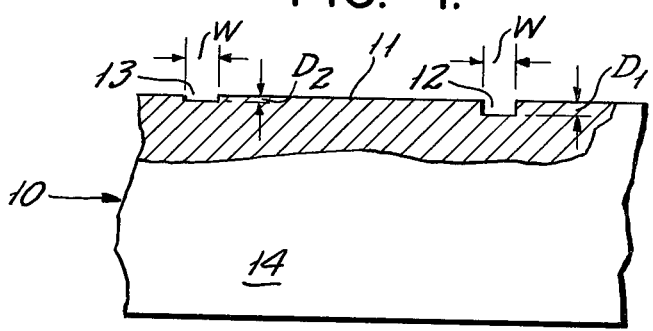
FIG. 4 is an enlarged fragmentary view in elevation of part of the base of the tool, partly broken away and in section, taken at 4—4 in FIG. 2.

Referring now to FIG. 4, the grooves 12–13 will be understood to be provided as appropriate for stripping optical fiber of given standard size. In any event, their widths may be to the same extent W to enable ample lateral clearance (e.g., a 0.005 inch clearance) with an inserted coated fiber, but the larger depth $D_1$ of groove 12 and the shallower depth $D_2$ of groove 13 are precisely determined by the specifications of the given standard size of optical fiber. Illustratively, a standard 500 μm buffered communication fiber of Corning Glass Works has an outer diameter $D_C$ (i.e., to the outside of the coating) of 0.020 inch, with a glass-fiber diameter $D_F$ of 0.005 inch. The depth $D_1$ of groove 12 should be one-half the diameter of the coated fiber, plus half the fiber diameter, plus a small clearance (e.g., 0.0015 inch) to assure against loaded blade contact with the fiber itself; based on the illustratively stated diameters, the depth of $D_1$ of groove 12 should be 0.014 inch. The depth $D_2$ of the shallow groove 13 should be the diameter of the glass of the fiber plus a small clearance (e.g., 0.001 inch); for the illustrative case, this means a shallow depth $D_2$ of 0.006 inch. The width W of both grooves would suitably be 0.025 inch.

Figure 5B:
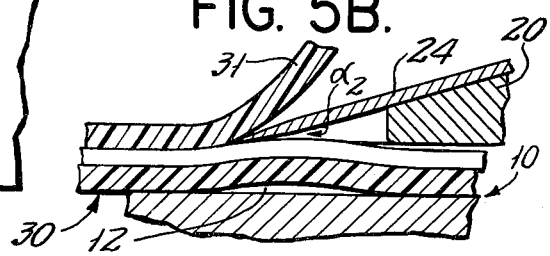

In use, say to strip an end of the indicated Corning product, and with the holder 20 in raised position, the buffered fiber (30) is first laid in the larger groove 12 and holder 20 is brought down, with the blade edge in contact with the buffer coat of the fiber. In this situation, the fiber end to be stripped extends beyond front edge 14, and the elongate remainder is beyond rear edge 15. A finger grasp of the coated fiber beyond edge 15, as by holding the fiber to the table top upon which base 10 may be resting, provides enough grip so that the device of FIG. 1 may be pushed forward, causing the sharp edge of blade 24 to enter and then to shave the buffer coat on a chord which would theoretically clear the glass fiber by 0.0015 inch; however, blade action on the buffer coat (in the course of longitudinal movement of buffered fiber in groove 12) is such as to locally elevate the buffered fiber from the bottom of groove 12, thus inducing a locally reduced rake angle $\alpha_2$ (FIG. 5B) of fiber-limited contact with the lower face of the cutting edge of the blade. This reduced rake angle $\alpha_2$ is less than $\alpha_1$ and will be understood to be sufficiently in approach to zero to avoid scoring of the fiber core, thus maintaining integrity of the glass fiber. Having thus shaved off a chord (31), the holder 20 is raised and the thus-shaved coated fiber is twisted 180° in the course of its transfer to shallow groove 12, where the flat shave cut enables flat bottoming reference in the shallow groove, and holder 20 is returned to its down position of blade-edge engagement with the unshaven side of the fiber. The described relative motion of stripper tool and fiber is then repeated, causing the sharp edge of blade 24 to enter and shave the buffer coat along a chord, and then to locally elevate the core to clear the bottom of groove 13 by 0.001 inch. As a practical matter, however, the hoop strength of the buffer coat, having been first shaven to zero or near-zero thickness, is practically zero, and therefore the second shaving cut is effective to fully strip the buffer coat without danger of scoring contact with the glass fiber.

The described stripping tool will be seen to achieve the stated objects. The device is portable and lends itself to use at the situs of splicing or terminating or otherwise connecting a standard optical fiber. The stripping may be performed either by holding the fiber and moving the tool, or by holding the tool and pulling the fiber. In either case, safe clearance is available to avoid loaded contact of the blade with the glass of the fiber. For many persons, the coated fiber may be hard to see, particularly when partially stripped; but, if one grasps the stripped end before removal from groove 12 and, say, with the thumb below the thus-partially stripped end, then it is a simple matter to rotate the gripping hand 180° in the course of transfer to groove 13 where, upon holder (20) placement in the down position, blade 24 presses upon the unshaven side of the buffer coat to an extent sufficient to achieve flat seating of the shaven side upon the bottom of groove 13 before the final shave step is performed. It is believed to be significant, in the achievement of stripping to an unscored glass-fiber core, that the low rake angle in conjunction with the clearances (here illustratively 0.0015 inch at 12 and 0.001 inch at 13) enables blade 24 to merely shave and never to load the fiber core, the latter being merely locally pendulously suspended via adjacent unstripped buffer coat, in the region of current shave action.

In some situations, especially where a connector is to be applied to the end of a patchcord, the removal of buffering is required virtually all the way to the outer jacket of the patchcord. The tool of the invention will be seen to have the capability of readily performing such a function.

In the form described, it will be noted that both grooves 12–13 are offset to one side of the midpoint of the cutting edge of blade 24. This arrangement will be seen to enable extended use of a given blade 24, by reversing the same after a first period of use in the position shown in FIG. 1.

While the invention has been described in detail for a preferred embodiment, it will be understood that modifications may be made without departing from the scope of the invention. For example, the upper surface 11 of the base may have more than the two described parallel grooves 12–13, the same being graded by indicia as appropriate for performing the described successive buffer-shaving operations on buffered optical fiber of different standard sizes and specifications, the operator merely selecting the groove to be used, in accordance with applicable size requirements.

What is claimed is:

1. A stripping tool for stripping the buffer coat from a buffer-coated optical fiber that is characterized by overall coated diameter of magnitude $D_C$ on an optical fiber of diameter of magnitude $D_F$, said tool comprising a base having a flat upper surface with at least two elongate grooves therein, a knife and knife holder having a flat bottom surface transversely spanning said grooves and having an articulated connection to said base such that in one position the cutting edge of the knife held by said holder and the bottom of said holder are both in contact with the flat upper surface of said base and in another position said knife and holder are sufficiently removed from the flat upper surface of said base to permit manually applied entry of a length of coated optical fiber in one of said grooves, the width of said grooves being in excess of the magnitude $D_C$, the depth of one of said grooves being in a first slight excess of the magnitude $(D_C+D_F)/2$, and the depth of the other of said grooves being in a second slight excess of the magnitude $D_F$.

2. The tool of claim 1, in which said holder positions the cutting edge at an angle ($\alpha_0$), in the range of substantially 10° to 20° to the upper surface of said base when in said one position.

3. The tool of claim 1, in which said second excess is approximately the size of said first excess.

4. The tool of claim 1, in which the articulation is about a hinge axis parallel to both grooves.

5. The tool of claim 1, in which said holder positions the cutting edge of said knife on an alignment perpendicular to the elongation of said grooves.

* * * * *